United States Patent [19]

Sazaki

[11] 4,155,517
[45] May 22, 1979

[54] FISHING SPINNING REELS

[75] Inventor: Kounin Sazaki, Fukuyama, Japan

[73] Assignee: Ryobi Limited, Japan

[21] Appl. No.: 867,207

[22] Filed: Jan. 5, 1978

[30] Foreign Application Priority Data

Jan. 24, 1977 [JP] Japan .............................. 52/7617[U]

[51] Int. Cl.$^2$ ........................ A01K 89/00; G05G 1/10
[52] U.S. Cl. .................................. 242/84.1 J; 74/547
[58] Field of Search ................... 242/84.1 J, 96, 84.8; 74/547, 546, 545

[56] References Cited

U.S. PATENT DOCUMENTS

| 1,330,260 | 2/1920 | Graham et al. | 74/547 |
| 3,948,117 | 4/1976 | Kimura | 242/84.1 J |

FOREIGN PATENT DOCUMENTS 29656 9/1964 German Democratic Rep. .... 242/84.1 J

Primary Examiner—George F. Mautz
Attorney, Agent, or Firm—William Anthony Drucker

[57] ABSTRACT

In a fishing spinning reel, a cylinder is connected to the outer end of a handle lever adapted to rotate the main body of the reel, and one end of a handle stay is slidably inserted into the cylinder. This end is provided with an annular groove, a pair of 180° apart axial notches connected to the groove and a key pin with a portion received in the groove. A spring is contained in the cylinder to urge outwardly the handle stay so as to cause either one of the notches to engage the key pin. To the outer end of the handle stay is rotatably connected a handle knob so that the knob can be folded inwardly or erected outwardly by forcing the handle stay into the cylinder and then rotating 180°.

8 Claims, 5 Drawing Figures

FISHING SPINNING REELS

BACKGROUND OF THE INVENTION

This invention relates to a fishing spinning reel and more particularly a fishing spinning reel provided with an improved foldable handle.

The handle of a fishing spinning reel projects in the lateral direction for a considerable distance so that it is folded when the fishing rod is contracted for transportation. In the conventional construction the handle is fixed at the folded position and projected by loosening and tightening screws so that it takes a considerable preparation time before the handle is erected after mounting the reel to the fishing rod. Furthermore, the screws tend to loosen during taking up of the thread thus causing the handle to jolt. When the handle jolts it is necessary to tighten the screws thus greatly decreasing the pleasure of fishing by rotating the handle in the forward and rearward directions to land a fish. To tighten the screws it is necessary to use means for preventing reverse rotation which often severs a thin string.

SUMMARY OF THE INVENTION

Accordingly, it is an object of this invention to provide an improved device for folding and erecting the handle of a fishing spinning reel capable of rapidly folding and erecting the handle without the difficulties described above.

Another object of this invention is to provide an improved device for folding and erecting the handle of a fishing spinning reel which is free from jolts during use and can prevent entanglement and jamming of the string.

A further object of this invention is to provide improved device for folding and erecting the handle of a fishing spinning reel which has a simple construction, does not include elements which become faulty during use and can be used for a long time.

According to this invention these and further objects can be accomplished by providing a fishing spinning reel comprising a main body, a rotor secured to the main body, a handle lever journalled by the main body and coupled to the rotor for rotating the same, a cylinder connected to the outer end of the handle lever, a handle stay with one end slidably received in the cylinder, said one end being provided with a pair of circumferentially spaced and axially extending notches connected to the annular groove, a key pin extending in a direction perpendicular to the axis of the cylinder with a portion received in the annular groove, and resilient means contained in the cylinder for urging the key stay outwardly so as to cause either one of the notches to engage the key pin.

BRIEF DESCRIPTION OF THE DRAWINGS

Further objects and advantages of the invention can be more fully understood from the following detailed description taken in conjunction with the accompanying drawings in which.

DESCRIPTION OF THE PREFERRED EMBODIMENT

Figure 5:
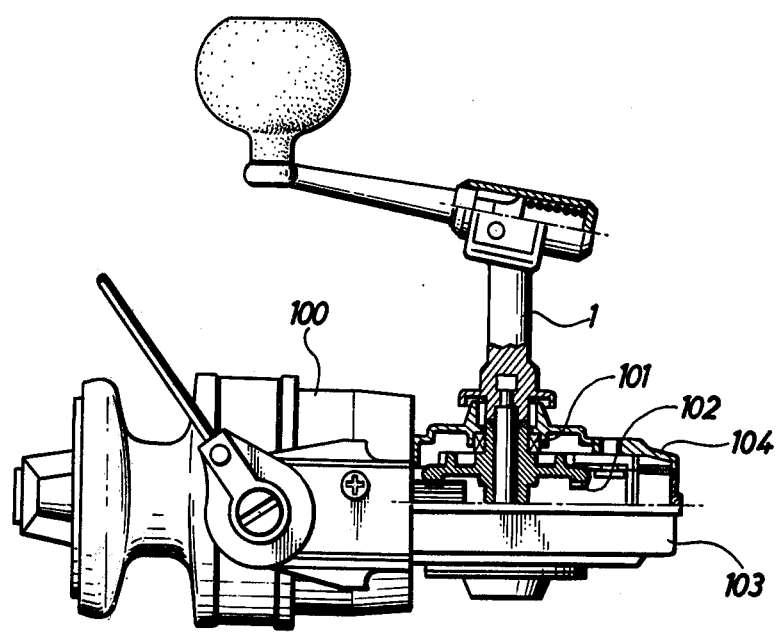
FIG. 5 is a side view, partly in section, showing a fishing spinning reel provided with the handle folding and erecting device of this invention.

As shown in FIG. 5, a handle lever 1 is fixed to a main gear 102 rotatably supported, for rotating a rotor 100, by bearings 101 secured to a lid 104 and a reel main body 103 which is mounted on a fishing rod in a well known manner. A cylinder 2 for receiving a handle stay 5 is secured to the outer end of the handle lever 1 at a desired angle with respect to the axis of lever 1 for facilitating the manipulation of the handle. One end of the cylinder 2 is closed as at 3 and the base portion a of the handle stay is slidably and rotatably received in an opening 4 at the other end. A compression spring 7 is interposed between the closed end 3 and the base portion a to urge outwardly the handle stay 5.

To the outer end 8 of the handle stay 5 is rotatably connected a handle knob 9 by means of a rivet 10 at a desired angle with respect to the axis of the stay. The base portion a is provided with an annular groove 11 at an intermediate portion thereof and a pair of notches 12 and 12' having arcuate inclined surfaces 12a and 12a' which are symmetrical with respect to the axis of the handle stay 5, the minimum diameter portions of the notches merging with the bottom surface of the annular groove. A transverse opening 13 is formed through the cylinder 2 at a point remote from the axis of the cylinder for receiving a key pin 14 which is removably inserted into the annular groove 11 and the notch 12'.

Figure 1:
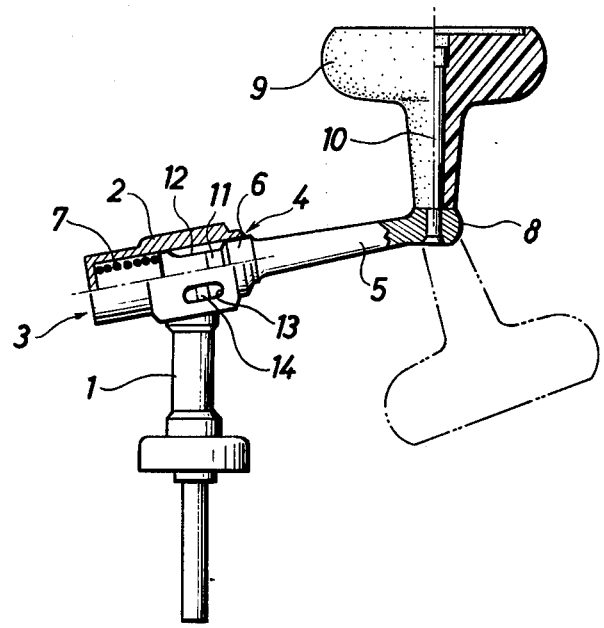
FIG. 1 is a plan view, partly in section, showing the handle folding and erecting device of a fishing spinning reel embodying the invention in an operating state.
Figure 2:
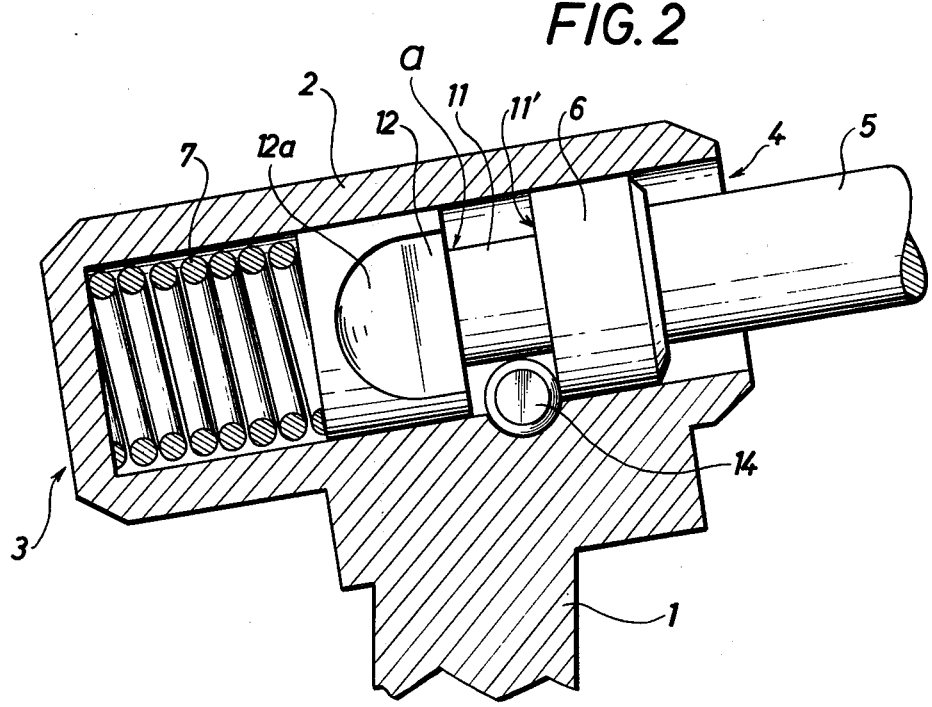
FIG. 2 is an enlarged sectional view of a cylinder and a handle stay received therein at this stage the handle stay may rotate as the key pin engages the annular groove.
Figure 3:
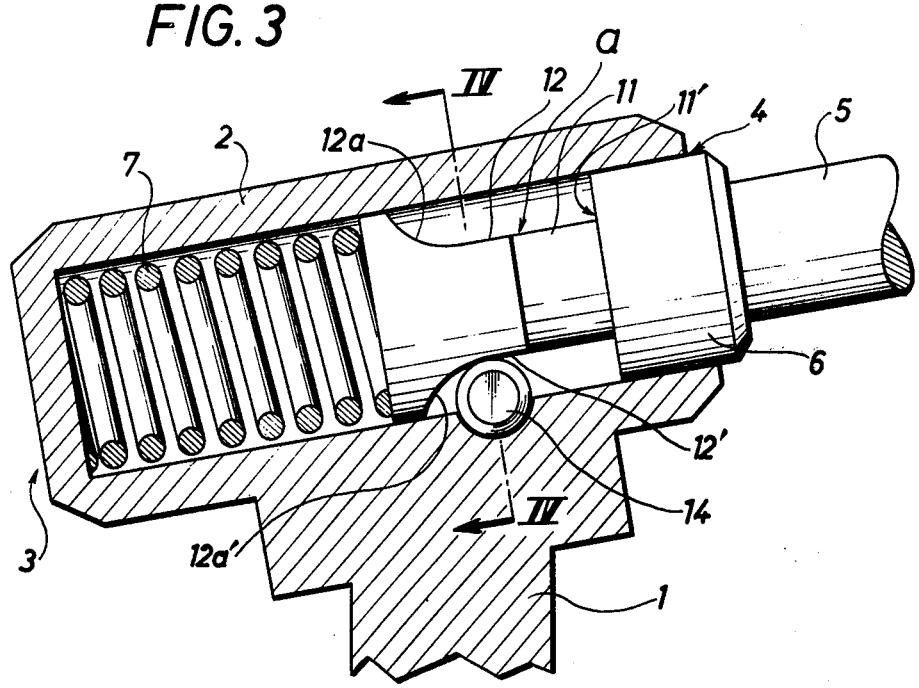
FIG. 3 is a sectional view showing the handle at this stage the handle is firmly held at its folded or erected state as the key pin engages one of the notches of the handle stay being pressed outwardly by the spring.
Figure 4:
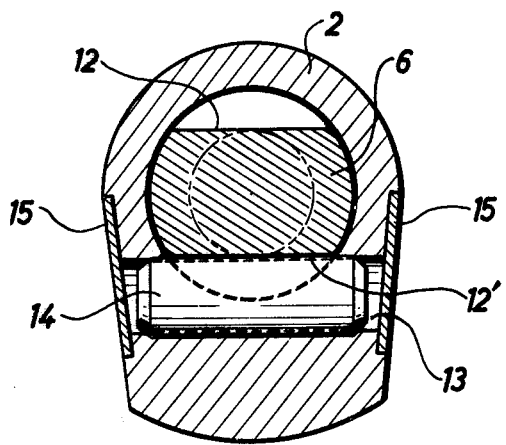
FIG. 4 is a cross-sectional view taken along a line IV—IV shown in FIG. 3.

In the example shown in FIG. 1, the key pin 14 has a polygonal cross-section, whereas in the example shown in FIGS. 2 to 4, the key pin has a circular cross-section. The opposite ends of the opening 13 are closed by closing plates 15 for preventing dropping of the key pin 14. To prevent the dropping of the key pin 14, any other suitable means can be used, for example force fit or axial splines on the periphery of the key pin 14. It should be understood that the positions of the notches 12 and 12' are not limited to those shown in the drawings.

In the operation of the device described above, when the key pin 14 is at a relative position corresponding to the annular groove 11, the handle stay 5 can rotate in any direction with respect to cylinder 2. However, when the handle stay 5 is rotated so as to cause either one of the notches 12 and 12' to receive the key pin 14, the handle stay 5 will be urged outwardly by the force of the compression spring 7 until key pin 14 is wedged by either one of the notches 12 and 12' as shown in FIGS. 1 and 3 whereby the handle stay 5 is fixed to the handle lever 1 with knob 9 directed outwardly as shown by solid lines in FIG. 1. Under these conditions, since the handle stay 5 is constantly urged outwardly by spring 7 there is no fear of jolting of the handle during the rotation thereof.

When the handle stay 5 is pressed inwardly against the force of spring 7, the key pin 14 disengages the notch and comes into engagement with the outer side wall 11' of the annular groove 11, that is the inner side surface of a cylindrical portion 6 having the same diameter as the inner diameter of cylinder 2. At this position the handle is rotated in either direction by 180° until the key pin engages other notch and fixed by spring 7. Then, the knob 9 is directed inwardly, or assumes the folded state as shown by dotted lines in FIG. 1.

Even when the handle knob 9 is folded or directed inwardly as above described, as the handle stay is urged by the spring to wedge the key pin by one of the notch, knob 9 is held positively in this position without the fear of returning to the erected state.

Where an additional key pin is provided at a symmetrical position, the wedging action can be made more positive. Instead of the arcuately inclined shape, the notches may have other suitable shape, for example, a stepped shape.

With the construction described above, it is possible to readily fold and erect the handle knob by merely slightly pushing it against the force of the spring and then rotating it 180°. Moreover, in both of the folded and erected states, as the key pin is wedged or held firmly by the force of the spring there is nor fear of jolting or changing the state. Smooth arcuate surfaces of the notches ensure positive holding action irrespective of the wear of the key pin or notches. Moreover since all of the elements utilized to fold and erect the handle knob are contained in the cylinder the chance of entangling and jamming of the thread can be eliminated. As the construction is simple and rugged there is no fear of fault.

Although the invention has been described in terms of a preferred embodiment thereof, it should be understood that the invention is by no means limited thereto but many changes and modifications may be made without departing the true spirit and scope of the invention as defined in the appended claims.

What is claimed is:

1. Fishing spinning reel comprising a main body, a rotor secured to the main body, a handle lever journalled by said main body and coupled to the rotor for rotating the same, a cylinder connected to the outer end of said handle lever, a handle stay with one end slidably received in said cylinder, said one end being provided with an annular groove and a pair of circumferentially spaced and axially extending notches connected to said annular groove, a key pin extending in a direction perpendicular to the axis of said cylinder with a portion received in said annular groove, and resilient means contained in said cylinder for urging said handle stay outwardly so as to cause either one of said notches to engage said key pin.

2. The fishing spinning reel according to claim 1 wherein said cylinder is connected to said handle lever at a predetermined angle.

3. The fishing spinning reel according to claim 1 wherein said pair of notches are spaced apart by 180° in the circumferential direction.

4. The fishing spinning reel according to claim 1 wherein said notches have inclined surfaces adapted to engage said key pin.

5. The fishing spinning reel according to claim 1 wherein said notches have arcuate surfaces adapted to engage said key pin.

6. The fishing spinning reel according to claim 1 wherein a pair of key pins are provided to cooperate with respective notches.

7. The fishing spinning reel according to claim 1 wherein said key pin is slidably contained in an opening extending through the wall of said cylinder, and the opposite ends of the opening are closed by closing plates.

8. The fishing spinning reel according to claim 1 wherein a handle knob is rotatably connected to the other end of said handle stay at a predetermined angle.

* * * * *